United States Patent [19]
Klein

[11] Patent Number: 6,158,129
[45] Date of Patent: Dec. 12, 2000

[54] UNIVERSAL CUTTING HEAD FOR A VEGETATION TRIMMER

[75] Inventor: James B. Klein, 910 Riverside Dr. East, Bradenton, Fla. 34808

[73] Assignee: James B. Klein, Bradenton, Fla.

[21] Appl. No.: 09/303,399

[22] Filed: May 1, 1999

[51] Int. Cl.⁷ .................................................. A01D 34/416
[52] U.S. Cl. ................................ 30/276; 30/347; 56/295
[58] Field of Search ...................... 30/276, 347; 56/12.7, 56/295

[56] References Cited

U.S. PATENT DOCUMENTS

| | | | |
|---|---|---|---|
| 3,900,071 | 8/1975 | Crawford | 172/15 |
| 4,068,377 | 1/1978 | Kimmel et al. | 30/276 |
| 4,190,954 | 3/1980 | Walto | 30/276 |
| 4,268,964 | 5/1981 | Moore | 30/276 |
| 4,513,563 | 4/1985 | Roser | 56/295 |
| 4,571,831 | 2/1986 | White | 30/276 |
| 4,644,655 | 2/1987 | Bottamiller | 30/347 |
| 4,756,146 | 7/1988 | Rouse | 30/276 X |
| 4,905,465 | 3/1990 | Jones et al. | 56/295 |
| 4,962,630 | 10/1990 | Jones | 56/12.7 |
| 5,048,278 | 9/1991 | Jones | 30/276 X |
| 5,197,264 | 3/1993 | Lacey | 56/12.1 |
| 5,303,476 | 4/1994 | Tuggle | 30/347 |
| 5,313,770 | 5/1994 | Smothers | 56/12.1 |
| 5,359,777 | 11/1994 | Bauer et al. | 30/276 |
| 5,479,763 | 1/1996 | Coble | 56/12.7 |
| 5,493,785 | 2/1996 | Lawrence | 30/276 X |
| 5,615,543 | 4/1997 | Caffey et al. | 56/295 |
| 5,659,964 | 8/1997 | Lawrence | 30/347 |
| 5,713,191 | 2/1998 | Welton | 30/276 X |
| 5,901,448 | 5/1999 | Lingerfelt | 30/276 |

*Primary Examiner*—Hwei-Siu Payer

[57] ABSTRACT

The present invention is a one-piece fixed line vegetation cutting head with several advantages. It is easily adaptable to virtually any vegetation trimmer and it will accommodate a variety of types and gauges of both cutting filament line and wire. The preferred embodiment has an upper portion with the shape of an inverted truncated cone which gives the head an advantage in deep vegetation by hindering the advance and entanglement of long pieces of vegetation around the vegetation trimmer's drive shaft. The preferred embodiment also has a disc-shaped lower portion with two pairs of cutting filament line passage holes in opposed positions near the circumference of the disc which are oriented at oblique angles to both the diameter and the central bore of the disc. When a discrete length of cutting filament line is inserted through the adjacent passage holes in each pair, it is subjected to less bending and wear during high speed rotation than would be experienced with the use of non-angular passage holes. Further, in the preferred embodiment, the lower portion has a tapered edge allowing a closer cutting angle when the cutting filament line becomes shortened due to wear. The simplified and improved design of the present invention reduces the need to replace cutting filament line as often and further enables a user to replace the cutting filament line within seconds when it becomes worn since no knotting of cutting filament line is required and there is no need for any disassembly of parts.

14 Claims, 2 Drawing Sheets

UNIVERSAL CUTTING HEAD FOR A VEGETATION TRIMMER

BACKGROUND

1. Field of Invention

This invention relates to vegetation cutting heads; especially for an improved cutting head for a vegetation trimmer.

2. Description of Prior Art

Although several types of vegetation cutting heads are known, there is an existing need for an improved and simplified method of securing a cutting filament line to the cutting head of a vegetation trimmer.

One type of prior art vegetation cutting head utilizes a spool within the cutting head to store cutting filament line which is manually or automatically dispensed as more line is needed during cutting operation. The disadvantages of spool type cutting heads is that they are designed with multiple parts, therefore, becoming expensive to manufacture, complicated to use, as well as having a higher potential for operational failure, examples being U.S. Pat. No. 5,359,777 (Bauer et. al.) and U.S. Pat. No. 4,068,377 (Kimmel et. al.).

Another prior art vegetation cutting head design; the fixed line variety, has negative aspects as well. The current fixed line devices use methods of attachment that involve the weaving of the cutting filament line through various channels, U.S. Pat. No. 4,190,954 (Walto) and U.S. Pat. No. 5,313,770 (Smothers) and U.S. Pat. No. 5,048,278 (Jones) or knotting the cutting filament line for security U.S. Pat. No. 4,644,655 (Boftamiller) and U.S. Pat. No. 5,713,191 (Welton) which uses a slip knot. These methods result in difficulty of removal and reinsertion of the cutting filament line. U.S. Pat. No. 5,303,476 (Tuggle) and U.S. Pat. No. 4,268,964 (Moore) disclosed an efficient vegetation cutting head with ease of removal and securement. These designs, however, have a fixed or removable tabs which have a possibility of mechanical failure; especially from excessive use and wear. U.S. Pat. No. 4,756,146 (Rouse) has a simplified and efficient method of securing the cutting filament line involving guiding the two end pieces of the cutting filament line through channels within the periphery of the disc. However, the manufacturing requires two plates joined into one device to create the channels for the cutting head. This patented invention requires more manufacturing, therefore, more expense. A similar design to the above is U.S. Pat. No. 5,197,264 (Lacey). The Lacey invention is designed as a one-piece, durable, maintenance free vegetation cutting head. Its cutting filament line passage holes are on the periphery of the rim of its disc. However, unlike U.S. Pat. No. 4,756,146 (Rouse), the cutting filament line(s) have to be woven through a series of holes for attachment which creates a time factor for the removal and insertion of new cutting filament line(s).

U.S. Pat. No. 4,571,831 (White III) has independent eyelets which are pressed into slits which impose a slight crimp in the cutting filament line which prevents the cutting filament line from moving. Excessive wear in a short period of time on this multi-piece fixed line vegetation cuffing head would quickly result in mechanical failure.

Another area of limitation in the prior art fixed line trimmer heads is the applicable type and gauge of the cutting filament line material used. Some cutting heads do not allow for substitution of different gauge or type of cutting filament line. An unusual and unique type of vegetation cutting head application is that of U.S. Pat. No. 3,900,071 (Crawford), which is limited to the usage of carpenters nails as cutting elements. A similar type of prior art invention like Crawford's uses nails and string cutting filament to achieve it's cutting ability is U.S. Pat. No. 5,493,785 (Lawrence). Both the Crawford and Lawrence inventions prove effective for cutting heavy vegetation. Unfortunately, they are somewhat dangerous if mechanical failure of the vegetation cutting head were to occur while in operation during high revolutions.

There are cutting heads that vary from one to six strands of cutting filament line, as well as a type that incorporates string cutting filament line with a cutting blade in unison, U.S. Pat. No. 4,513,563 (Roser). This invention would require more maintenance and expense in replacement of both types of cutting filament lines.

The earlier vegetation cutting heads of one and two strand cutting filament line(s) are being improved by four to six strand types which give better cutting ability and longevity of string cutting filament.

A recent patent, U.S. Pat. No. 5,479,763 (Coble) has overcome part of the deficiencies of the previous fixed line cutting heads. However, Coble still hasn't conquered the two types of stresses on the cutting filament line. Due to the perpendicular placement of the cutting filament line passages, the cutting filament line is forced to bend at nearly a ninety degree angle due to rotational force under high speed revolutions of the vegetation cutting head as well as centrifugal force making the cutting filament line(s) project outwardly. This causes the heaviest stress point at the bend of the cutting filament line and causes premature wearing and/or breaking of the cutting filament line at this point. Coble criticizes the Lacey invention stating that the cutting filament line orientated outwardly have a tendency to break. Experimentation has demonstrated that Coble's criticism is incorrect. As the outward angle of the passage holes is increased, the cutting filament line has to bend less; therefore, resulting in less breakage.

Another problem with Coble's invention is slippage of the cutting filament line due to the parallel placement of the cutting filament line passage holes to the circumference of the disc. The placement doesn't allow the cutting filament line to equally rest on the disc between the plurality of holes, but instead, causes unequal stress due to the trailing effect on the cutting filament line which results from the rotational force and centrifugal force combined.

The present invention overcomes all of the disadvantages of the prior art vegetation cutting heads above and fulfills an existing need for an improved and simplified method of securing a cutting filament line to the cutting head of a vegetation trimmer.

OBJECTS AND ADVANTAGES

Accordingly, several objects and advantages of the present invention are its simple and sturdy construction that may be economically manufactured for use with varying types of cutting filament line vegetation trimmers. The present invention is an improved "fixed line" vegetation cutting head for vegetation trimmers. The improvement is within the installation and securing of the cutting filament line to the head.

The present vegetation cutting head will accommodate various types of gauges of cutting filament line as well as wire.

The present invention is improved to allow discrete lengths of cutting filament line to be quickly and easily attached to the head without requiring a disassembly of any part(s). As well, the cutting filament line does not require any knotting or forming to secure it to the vegetation cutting head. The head itself holds the cutting filament line in place due to centrifugal force and allows the cutting filament line to be quickly and easily replaced without any tools when it becomes worn from use.

The present invention has an improved positioning of the cutting filament line passage holes on the circumference of the disc. The cutting filament line passage holes which are outwardly and obliquely angled relative to both the diameter and the central bore of the disc, enable the cutting filament line to seat equally upon the land of the disc reducing slippage during axial rotation. Additionally, the outwardly and obliquely angled cutting filament line passage holes which go through the disc portion reduce additional stress of the cutting filament line from bending due to centrifugal forces at high RPM'S.

A tapered edge on the present invention allows a closer cutting angle when the cutting filament line becomes shortened due to wear.

The inverted truncated cone shaped upper portion of the present invention is an advantage in deep vegetation since the inward sloping of the shaft hinders vegetation from advancing toward the mounting portion of the vegetation cutting head and getting caught between the cutting head and the associated vegetation trimmer. Still further objects and advantages will become apparent from a consideration of the ensuing description and accompanying drawings.

REFERENCE NUMERALS

Figure 1:
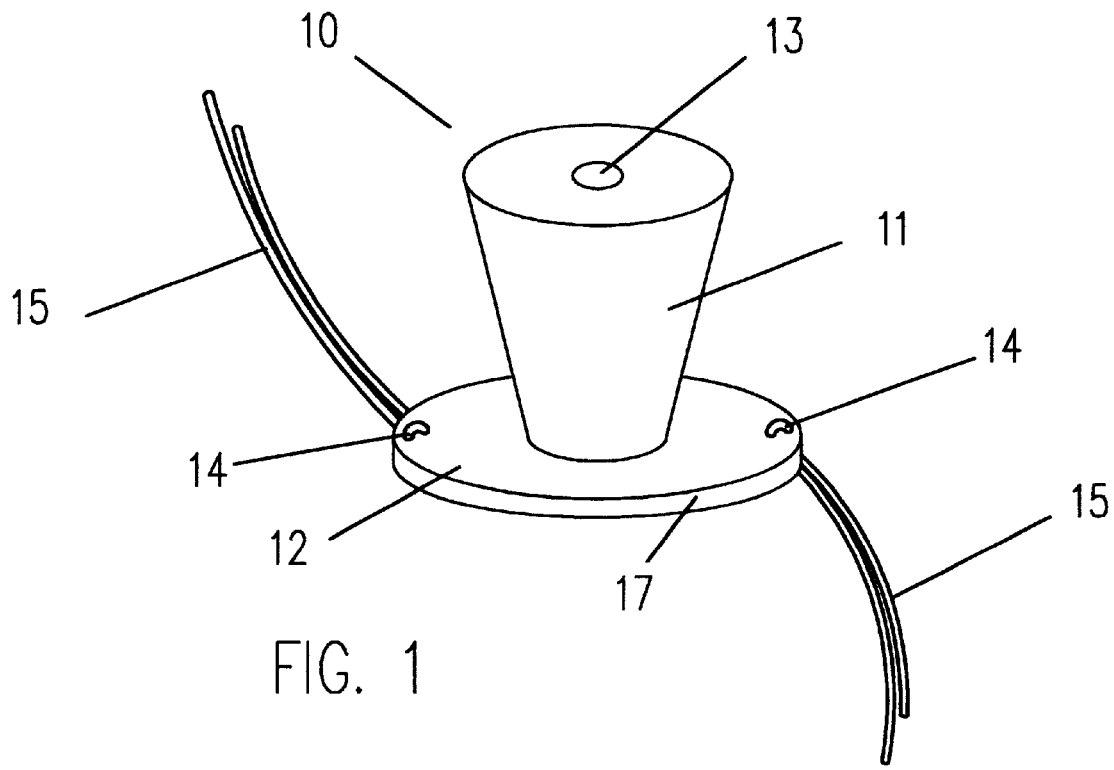
FIG. 1 is a perspective view of a cutting head for a vegetation trimmer according to the invention.
Figure 1A:
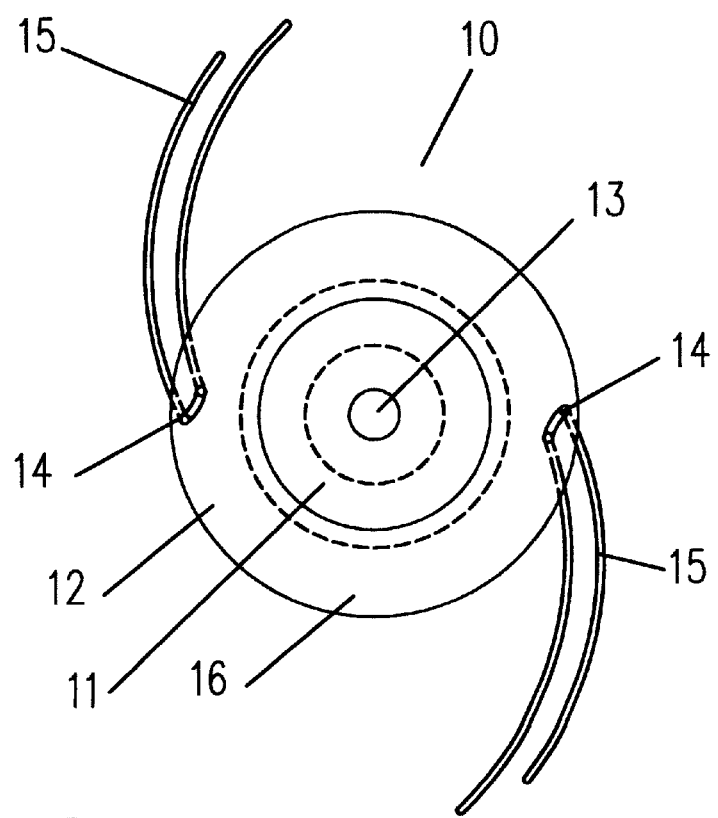
FIG. 1A is a top view of the cutting head of FIG. 1.
Figure 1B:
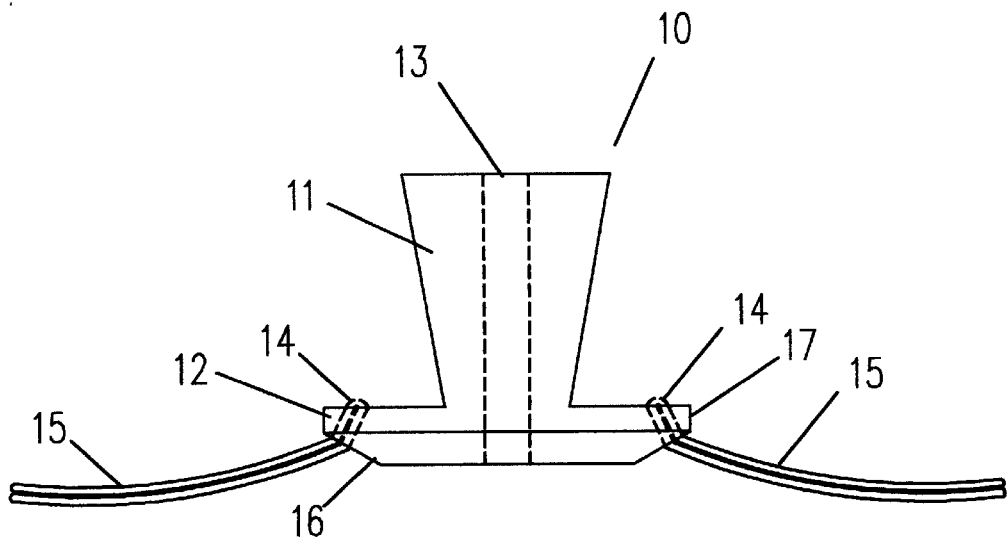
FIG. 1B is a side view of the cutting head of FIG. 1.
Figure 1C:
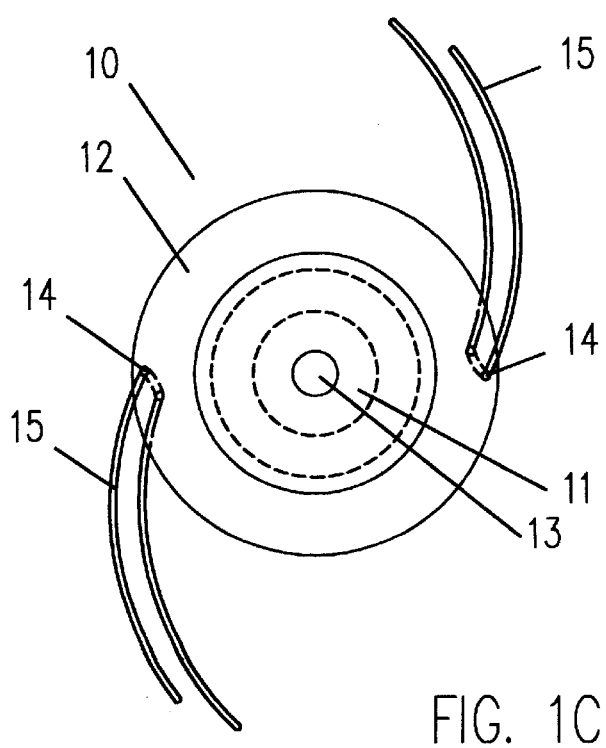
FIG. 1C is a bottom view of the cutting head of FIG. 1.

10 Vegetation Cutting Head
11 Conically Shaped Mounting Portion
12 Filament Retaining Section
13 Mounting Block Hole
14 Angled and Rotated Cutting Filament Line Passage Holes
15 Cutting Filament Line
16 Tapered Edge
17 Vertical Side Surface of Filament Retaining Section

SUMMARY

The vegetation cutting head provides for a more simplified method of removal and replacement of cutting filament line attached to the head. The manufacture of the present invention is simplified due to being a one-piece unit, resulting in the ability to produce a low cost and durable vegetation cutting head. The oblique and outwardly angular placement of the cutting filament line passage holes, tapered edge of the lower disc, as well as the inverted truncated cone shaped upper portion improves upon all of the prior art of "fixed-line" vegetation cutting heads.

Preferred Embodiment—Description

FIG. (1) shows a perspective view of a basic version of the vegetation cutting head (10). FIG. (1A) shows a top view, (1B) shows a side view and (1C) shows a bottom view of this same embodiment. Vegetation cutting head (10) is a one-piece device ideally molded, which consists of an inverted conically shaped upper portion (11) and a larger diameter discshaped filament retaining section (12) with a bottom surface, a vertical side surface (17), and an inwardly tapered edge (16) shown in FIG. (1B). Inverted truncated cone-shaped upper portion (11) is an advantage in deep vegetation since its inwardly sloping sides hinder vegetation from advancing toward the associated vegetation trimmer and getting caught between it and vegetation cutting head (10) or tangled around the vegetation trimmer drive shaft during high speed rotation of the drive shaft.

Vegetation cutting head (10) is mounted to a vegetation trimmer (not shown) by means of a universal threaded adaptor (not shown) inserted in mounting block hole (13). The mounting block hole (13) is located at the axial center of vegetation cutting head (10) to enable it to be attached to a rotatable drive element of an associated vegetation trimmer (not shown). The cutting filament line retaining section (12) contains two pairs of outwardly angular cutting filament line passage holes (14) in opposed positions from one another on opposite sides of the disc. In each pair, the obliquely and outwardly angular cutting filament line passage holes (14) are in close proximity to one another. In FIG. (1B) cutting filament line passage holes (14) are shown positioned near to vertical side surface (17) with cutting filament line passage holes (14) extending between the top surface of cutting filament line retaining section (12) and inwardly tapered edge (16). A discrete length of cutting filament line (15) is threaded downwardly into each pair of cutting filament line passage holes (14) and the opposite ends of each cutting filament line (15) are inserted through the cutting filament line passage holes (14) until the center of each cutting filament line (15) engages against the land.

Various types and gauges of cutting filament line (15) will be accommodated by cutting filament line passage holes (14), as well as wire (not shown), and since centrifugal force holds cutting filament line (15) in place, no knotting of cutting filament line (15) is required. In addition to cutting filament line passage holes (14) being angled obliquely and outwardly relative to mounting block hole (13), both pairs of cutting filament line passage holes (14) are also positioned through cutting filament line retaining section (12) so that upon rotation of vegetation cutting head (10) one of the cutting filament line passage holes (14) in each of the pairs becomes a leading hole and the other cutting filament line passage hole (14) becomes a trailing hole with each of the leading holes being oriented toward mounting block hole (13) and each of the trailing holes being oriented toward the circumference of cutting filament line retaining section (12) so that when individual lengths of cutting filament line (15) are inserted downwardly through each pair of cutting filament line passage holes (14) the cutting filament line (15) is subjected to less bending at high rotational speeds for less wear. Although only two pairs of passage holes (14) are shown in the illustrations herein, it is considered within the scope of the present invention for cutting filament line retaining section (12) to have more than two pairs of evenly spaced-apart cutting filament line passage holes (14). The embodiments described herein have been for illustrative purposes only.

Preferred Embodiment—Operation

When attached to a drive shaft of a power driven vegetation trimmer, the vegetation cutting head (10) (FIG. 1) axially rotates causing the free ends of the cutting filament line(s) (15) attached to the land of the disc (12) to be extended outwardly by centrifugal force into cutting position in a perpendicular plane to the axial rotation.

Conclusions, Ramifications, And Scope

Accordingly, after reviewing this material, one can conclude that the vegetation cutting head of the present invention is a one-piece and lightweight device that can be used by any person(s). It is extremely reliable, economical to produce, as well as adaptable to virtually any type of vegetation trimmer unit.

Although the description above contains many specificities, these should not be construed as limiting the scope of the invention but as merely providing illustrations of some of the presently preferred embodiments of this invention. Various other embodiments and ramifications are possible within its scope. For example, the size and type of material and adapter unit may be varied. The angle and the rotated position of the cutting filament line passage holes need to be maintained; however, additional sets may be added equidistantly from each other depending on the type and application of vegetation cutting.

Thus the scope of the invention should be determined by the appended claims and their legal equivalents, rather than by the examples given.

What is claimed is:

1. A one-piece cutting head for attachment to the drive shaft of a vegetation trimmer, said cutting head comprising an upper portion having the shape of an inverted truncated cone, said upper portion also having a longitudinal axial bore with a diameter dimension sufficient for insertion therethrough of the drive shaft of the vegetation trimmer; and a disc-shaped lower portion downwardly depending from said upper portion, said lower portion having a circumference and a central bore, said central bore communicating with said axial bore of said upper portion so as to also allow insertion therethrough of the vegetation trimmer's drive shaft, said lower portion having a plurality of pairs of cutting filament line passage holes therethrough, each of said cutting filament line passage holes within each of said pairs are approximately parallel to one another, said pairs of cutting filament line passage holes being evenly spaced from one another, each of said cutting filament line passage holes being downwardly angled through said lower portion toward said circumference, said cutting filament line passage holes each also being positioned through said lower portion so that upon rotation of said cutting head one of said cutting filament line passage holes in each of said pairs becomes a leading hole and the other of said cutting filament line passage holes becomes a trailing hole each of said leading holes being oriented toward said central bore and each of said trailing holes being oriented toward said circumference so that when individual lengths of cutting filament line are inserted downwardly through each of said pairs of cutting filament line passage holes said cutting filament line is subjected to less bending at high rotational speeds for less wear.

2. The cutting head of claim 1 wherein said lower portion has a bottom surface, and an inwardly tapered edge adjacent to said bottom surface, and further wherein said cutting filament line passage holes each extend through said inwardly tapered edge.

3. The cutting head of claim 2 wherein said disc-shaped lower portion further comprises a vertical side surface and a top surface, and wherein each of said cutting filament line passage holes is positioned near to said vertical side surface and extends between said top surface and said inwardly tapered edge.

4. The cutting head of claim 1 wherein said uper portion has a height dimension and said lower portion has a thickness dimension, and further wherein said height dimension is greater than said thickness dimension.

5. A one-piece cutting head for attachment to the drive shaft of a vegetation trimmer, said cutting head comprising an upper portion having a longitudinal axial bore with a diameter dimension sufficient for insertion therethrough of the drive shaft of the vegetation trimmer; and a disc-shaped lower portion downwardly depending from said upper portion, said lower portion having a circumference and a central bore, said central bore communicating with said axial bore of said upper portion so as to also allow insertion therethrough of the vegetation trimmer drive shaft, said lower portion having a plurality of pairs of cutting filament line passage holes therethrough, said pairs of cutting filament line passage holes being evenly spaced apart from one another, each of said cutting filament line passage holes being downwardly angled through said lower portion toward said circumference, said cutting filament line passage holes each also being positioned through said lower portion so that during rotation of said cutting head one of said cutting filament line passage holes in each of said pairs becomes a leading hole and the other of said cutting filament line passage holes becomes a trailing hole, each of said leading holes being oriented toward said central bore and each of said trailing holes oriented toward said circumference so that when individual lengths of cutting filament line are inserted downwardly through each of said pairs of cutting filament line passage holes the cutting line is subjected to less bending at high rotational speeds for less wear.

6. The cutting head of claim 1 wherein said upper portion has the shape of an inverted truncated cone adapted to minimize the advancement and entangling of vegetation around the drive shaft of an attached vegetation trimmer during high speed rotation of said cutting head and the drive shaft.

7. The cutting head of claim 1 wherein each of said cutting filament line passage holes within each of said pairs are approximately parallel to one another.

8. The cutting head of claim 1 wherein said lower portion has a bottom surface and an inwardly tapered edge adjacent to said bottom surface, and further wherein said cutting filament line passage holes each extend through said inwardly tapered edge.

9. The cutting head of claim 8 wherein said disc-shaped lower portion further comprises a vertical side surface and a top surface, and wherein each of said cutting filament line passage holes is positioned near to said vertical side surface and extends between said top surface and said inwardly tapered edge.

10. The cutting head of claim 1 wherein said upper portion has a height dimension and said lower portion and said lower portion has a thickness dimension, and further wherein said height dimension is greater than said thickness dimension.

11. A method for assembling a trimming head to a vegetation trimmer, said method comprising the steps of providing a vegetation trimmer having a drive shaft; a cutting head having a central bore and a disc-shaped lower portion with a circumference and a plurality of spaced apart pairs of dually angled cutting filament line passage holes therethrough, the angled cutting filament line passage holes being both angled obliquely and downwardly through said lower portion toward said circumference and obliquely angled relative to said circumference to provide a leading cutting filament line passage hole near to said central bore and a trailing cutting filament line passage hole toward said circumference; and a plurality of lengths of cutting filament line each having opposite ends;

inserting said drive shaft through said central bore of said cutting head;

securing said cutting head to said drive shaft so that said cutting head will rotate at the same speed as said drive shaft;

inserting said opposite ends of one of said lengths of cutting filament line downwardly through each of said angled cutting filament line passage holes in a first of said pairs of angled cutting filament line passage holes in said disc-shaped lower portion;

inserting said opposite ends of one of said lengths of cutting filament line downwardly through each of said angled cutting filament line passage holes in the remainder of said pairs of angled cutting filament line passage holes in said disc-shaped lower portion; and adjusting said opposite ends so that each of said opposite ends is approximately equal in length to the other of said opposite ends so that said lengths of cutting filament line are positioned to bend less during high speed rotation of said drive shaft and thereby be less subject to wear.

12. The method of claim 11 wherein said step of providing said vegetation cutting head further comprises providing the cutting head with an upper portion having the shape of an inverted truncated cone adapted to provide less advancing and entanglement of long vegetation with said drive shaft.

13. The method of claim 12 wherein said step of providing said vegetation cutting head further comprises providing the cutting head with side edges having a tapered lower part adapted to allow a closer cutting angle when said cutting filament line is shortened due to wear.

14. The method of claim 11 wherein said step of providing said vegetation cutting head further comprises providing the cutting head with side edges having a tapered lower part adapted to allow a closer cutting angle when said cutting filament line is shortened due to wear.

* * * * *